July 13, 1965 D. GOTTWALD, JR 3,194,602

SAFETY BELT ATTACHMENT

Filed Aug. 23, 1962

HOOK PORTION IN POSITION B;
LOCK PIECE IN POSITION C

HOOK PORTION IN POSITION B;
LOCK PIECE IN POSITION D

INVENTOR.
DONALD GOTTWALD, JR.
BY
ATTORNEY

United States Patent Office 3,194,602
Patented July 13, 1965

3,194,602
SAFETY BELT ATTACHMENT
Donald Gottwald, Jr., 2938 Walnutridge Road,
Akron, Ohio
Filed Aug. 23, 1962, Ser. No. 219,024
3 Claims. (Cl. 297—385)

This invention relates to the attachment of a safety belt to the floor of an automobile or other base. More particularly, it relates to an improved lock piece on a hook used in such an attachment which keeps the belt properly aligned even when not under tension, so that when a sudden jerk is applied to the belt it becomes properly positioned and holds fast.

It is customary to hold a safety belt in an automobile by engaging a hook at the end of the belt in an eyebolt which is held in the floor of the automobile. The hook is fabricated of sheet metal with a hook portion separated from the body portion by a slot. The end of the belt is fastened flat against the body portion of the hook so that the belt and hook both lie in substantially the same plane. In such an attachment, when the belt is under tension, the hook and belt are aligned in the plane with the shank of the eyebolt, or substantially so. In this position, the eye of the eyebolt is in the end of the slot in the hook and pulls directly down on the hook.

A difficulty with such an attachment has been that when not under tension, the hook slumps over and turns out of alignment with the shank of the eyebolt, and, when slumped, often a portion of the hook slips through the eye. When in the aligned position the hook withstands the greatest pulling force without distortion. If the hook is not aligned with the eye it is apt to become jammed when the belt is jerked, and to become bent and then either break or become disengaged from the eyebolt. The hook of this invention is provided with a lock piece which prevents it from becoming misaligned.

The invention is illustrated in the accompanying drawings, in which—

Figure 1:
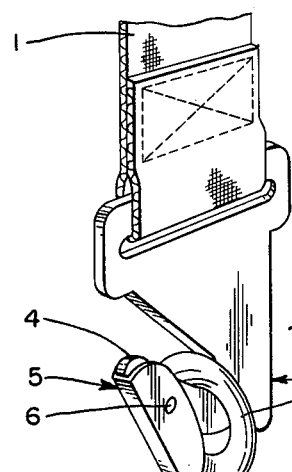
FIGURE 1 is a side elevation of the attachment combination with the eyebolt, hook and belt in the position they occupy when the belt is under tension.

The attachment of the invention includes the safety belt 1 with one end attached to a hook 2 which includes a body portion 3 and hook portion 4. This end of the belt and the hook are both in the same plane. The lock piece 5 is pivoted at 6 to the hook portion 4. The hook portion adjacent its base where it joins the body portion is of uniform width so that it can be extended further through the eyebolt 8 until the heel 9 of the hook is brought against the eye 10 of the eyebolt. This extended position indicated in FIGURE 2 by the dotted line indication of the heel 9 is referred to herein as position A. The position of the hook shown in FIGURES 1–4 is referred to as position B.

The eyebolt 8 includes the eye 10, the base 13 and the shank or threaded portion 14 by which the nut 15 holds the eyebolt upright in the floor 16.

Figure 2:
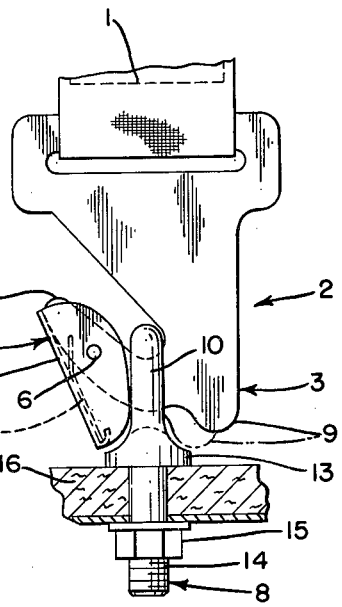
FIGURE 2 is a view of the same taken from a different angle and with the eyebolt of the combination fastened in the floor of an automobile, with a dotted line indication of the position which the heel of the hook occupies when being assembled.

The lock piece 5 is formed of sheet metal and includes the base 18 with parallel edges and the two sides 19 which are integral with the base. The end of the base of the lock piece which is extended in FIGURE 2 is bent over at 21 (FIGURE 3A), and one end of the leaf spring 22 in engaged between this and the base 18. The other end of the spring is slipped into the slot 24 in the hook portion. When the hook is engaged with the eyebolt (FIGURE 2) the spring keeps the end of the lock piece nearest the eyebolt extended away from the hook portion, as shown in FIGURE 2.

Figure 3:
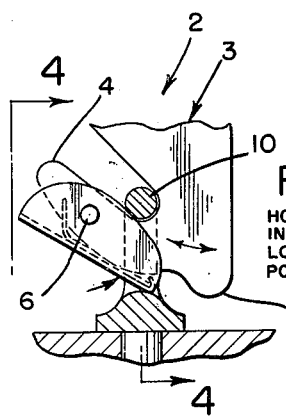
FIGURE 3 is a detail showing the position of the lock piece as the hook is being assembled in the eyebolt.
Figure 3A:
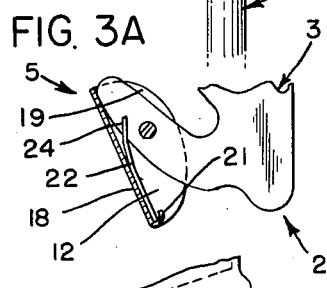
FIGURE 3A is a detail showing the interrelation of the lock piece (partly broken away), the spring and the hook portion of the hook.

If the hook is moved to position A, the presence of the spring 22, does not prevent the extended end of the lock piece from being manually pressed against the hook portion 4, so that the hook portion can be passed through the eye 10, as illustrated in FIGURE 3. FIGURE 3 equally well illustrates the position of the lock piece when the hook is being engaged with the eyebolt.

Figure 5:
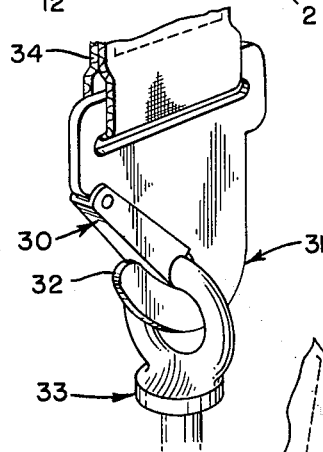
FIGURE 5 is an elevation of a prior-art attachment with the belt under tension.
Figure 6:
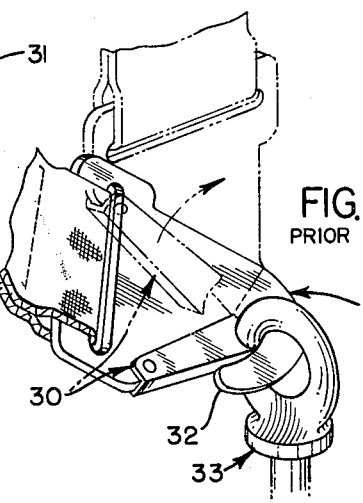
FIGURE 6 is a similar view of the same prior-art attachment, showing in full lines the position of the hook when it is slumped so that the belt is not aligned with the shank of the eyebolt, and in dotted lines a distorted condition of this hook after being suddenly jerked.
Figure 4:
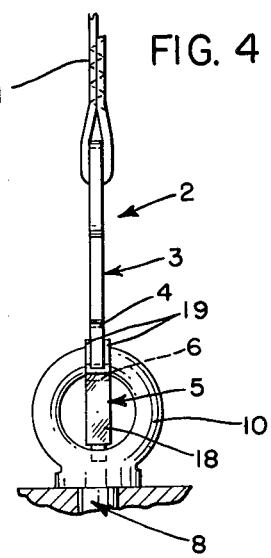
FIGURE 4 is a view on the line 4—4 of FIGURE 3, but of the complete attachment, as it is when being assembled.

The advantages of the improved construction are best understood if the disadvantages of the prior art attachments are clearly understood. FIGURE 5 and 6 show one prior-art attachment in which a lock piece 30 is pivoted to the base portion 31 of the hook instead of to the hook portion 32, as in applicant's attachment. The eyebolt is identified as 33. After the hook has become engaged in the eyebolt, the lock piece 30 is swung into place so that its end prevents the hook from becoming disengaged from the eyebolt. This is an improvement over the use of a hook without any lock piece, but when the belt is not under tension the hook slumps from the vertical position and may assume a position such as is shown in full lines in FIGURE 6 in which the hook and the belt are no longer aligned with the shank of the eyebolt because the hook has become partially dislodged from its full engagement in the eye, as shown in FIGURE 5. If the belt is suddenly jerked up, the hook will not slide up to the vertical position shown in FIGURE 5 but will remain partially dislodged so that a strong jerk on the belt jams and bends the hook so that it may be disengaged from the hook, or if the pull is strong enough the hook portion 32 may break. In either case, the safety belt does not hold. If the hook jams without breaking on the first jerk, it is apt to break on a subsequent jerk.

In the attachment of this invention the heel 9 of the hook and the extended end of the lock piece (FIGURE 2) permit only very limited movement of the hook in the eyebolt. Thus, the end of the belt which is engaged in the hook is kept aligned with the shank of the eyebolt. The hook cannot be diverted so far to either one side or the other of the plane of the shank of the eyebolt that a jerk on the belt would cause the hook to jam.

The invention is covered in the claims which follow.

What I claim is:

1. The combination of a safety belt, an eyebolt and a base, which includes
    an eyebolt with its shank held in the base, and
    a flat hook with one end of the belt engaged in flat relation in an elongated opening therein whereby said end of the belt and the hook are in the same plane,
    the eyebolt having a base portion between its shank and its eye,
    said hook including a body portion and a hook portion both in the same plane as said end of the belt, with a slot in one edge of the hook dividing said portions, the hook portion being engaged in the eye with the outer portion of the eye in the closed end of the slot, the body portion of the hook having a heel which extends from its base where the hook portion joins the body portion, said heel limiting the amout of the hook that can be passed through the eye, the hook portion being extended through the eye until said heel is against the eye, and a lock piece swivelly attached near its outer end to the hook portion near its outer end, and comprising two sides the opposite end of the lock piece being movable to and from the hook portion when the hook is extended through the eye, the lock piece being movable in and out of the eyebolt with the hook portion when said opposite end of the lock piece is adjacent the hook portion, said lock piece comprising two sides each of which covers a part of one side of the hook portion, which sides are joined adjacent one edge of each over the edge of the hook portion between its heel and said outer end of the hook portion, the opposite edges of said sides tapering toward the end of the lock piece opposite said outer end thereof in a plane perpendicular to the hook portion, said sides being against one side of the eyebolt when the hook portion rests on the eyebolt with its heel against the other side whereby the hook portion is held in substantial alignment with the shank.

2. The combination of claim 1 in which spring means presses said outer end of the lock piece against the hook portion.

3. The combination of claim 2 in which the spring means is a leaf spring one end of which is engaged in the edge of the hook portion which is nearest the lock piece and the other end presses the outer end of the lock piece against the hook portion.

References Cited by the Examiner
UNITED STATES PATENTS
3,074,760  6/63  Hodgekin _____ 297—386

FRANK L. ABBOTT, *Primary Examiner*